US 6,553,791 B1

United States Patent
Osaka et al.

(10) Patent No.: US 6,553,791 B1
(45) Date of Patent: Apr. 29, 2003

(54) ETCHING AN OPTICAL FIBER FUSION SPLICE

(75) Inventors: Keiji Osaka, Kanagawa (JP); Kenji Fujino, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 207 days.

(21) Appl. No.: 09/588,309

(22) Filed: Jun. 6, 2000

(30) Foreign Application Priority Data

Jun. 23, 1999 (JP) .......................................... 11-176485

(51) Int. Cl.⁷ ............................................. G02B 6/255
(52) U.S. Cl. .......................................... 65/407; 65/429
(58) Field of Search .................................. 65/429, 407

(56) References Cited

U.S. PATENT DOCUMENTS

| | | | | |
|---|---|---|---|---|
| 3,819,249 A | * | 6/1974 | Borner et al. | 385/39 |
| 4,566,889 A | * | 1/1986 | Schmadel, Jr. | 216/66 |
| 4,954,152 A | * | 9/1990 | Hsu et al. | 65/407 |
| 5,299,274 A | * | 3/1994 | Wysocki et al. | 385/96 |
| 6,173,095 B1 | * | 1/2001 | Sakano | 359/341.1 |
| 6,275,627 B1 | * | 8/2001 | Wu | 385/123 |
| 6,336,749 B1 | * | 1/2002 | O'Toole et al. | 385/96 |

FOREIGN PATENT DOCUMENTS

| | | | | |
|---|---|---|---|---|
| JP | 58-42011 | * | 3/1983 | 65/407 |

OTHER PUBLICATIONS

Kihara et al, "Connection Loss Reduction Using Thernally–diffused Expanded Core Fibers", The transactions of the Institute of electronics, Information and Communications Engineers, Jul. 1991, B–I, Bol. J–75–B–1, No. 7, pp. 467–470.*

* cited by examiner

*Primary Examiner*—John Hoffmann
(74) *Attorney, Agent, or Firm*—McDermott, Will & Emery (57) ABSTRACT

An exposed part of at least one of two optical fibers with different mode field distributions to be fusion spliced is heated by a burner, to thereby continuously vary its mode field distribution in the longitudinal direction of the optical fiber, and the exposed end part of at least one of the optical fibers is cleaved so that the mode field distributions at the splice end faces of the two optical fibers to be fusion spliced are substantially coincident with each other in configuration, the two optical fibers are fusion spliced, whereby low splice loss is realized. Thereafter, the heated portion of the optical fiber is subjected to a surface treatment by etching process using a hydrofluoric acid solution, whereby a deterioration of its mechanical strength is prevented. Surface tension of the acid causes the rim of the container to stand up.

2 Claims, 5 Drawing Sheets

ETCHING AN OPTICAL FIBER FUSION SPLICE

BACKGROUND OF THE INVENTION

1. Field of the Invention

The present invention relates to an optical-fiber fusion-splicing method for fusion-splicing optical fibers with mode field distributions being different from each other at low splice loss and with less reduction of its mechanical strength.

2. Description of the Related Art

The optical communication using a quartz single mode optical fiber has an advantage of large transmission capacity. A wave-length division multiplexing communication (WDM communication) using wave length region of 1.55 $\mu$m or therearound, which is a minimum loss wave length of the single mode optical fiber, is known as a technique which makes full use of the advantage of the large transmission capacity, and is put into practical use. In the WDM communication, it is desirable that the transmission rates of the waves of those wavelengths are equal to one another. To this end, there is an approach in which the dispersion characteristic of the single mode optical fiber is controlled by appropriately selecting the structure and physical properties of the single mode optical fiber. To be more specific, the dispersion characteristic of the single mode optical fiber is determined by its refractive index distribution and materials constituting the single mode optical fiber. Therefore, a desired dispersion characteristic of the single mode optical fiber is obtained by properly designing the distribution and selecting the materials. A single mode optical fiber used for a 1.55 $\mu$m band is generally called a 1.55 $\mu$m-band dispersion shifted fiber.

If a more precise control is required for the dispersion characteristic of the transmission path in order to increase the transmission capacity of the WDM communication, a dispersion shifted fiber sometimes is spliced, at its terminal or mid-point, to another optical fiber having a refractive index distribution, which is different from that of the dispersion shifted fiber, such as a dispersion compensation fiber. When optical fibers having different refractive index distributions, or different mode field distributions, are spliced, a spliced loss is caused, at the splice point, due to the mismatching of the mode field distributions. The splice loss cancels the advantage of the optical fiber, i.e., low loss. Therefore, the matching of the mode field distributions of the optical fibers at the splice point is very important in realizing a long distance communication, e.g. a communication using an under-water optical-fiber cable. A high mechanical strength is also required for the under-water optical-fiber cable in order to prevent the optical-fiber cable from being broken by a large tension applied when it is laid. For this reason, where the splice points of the optical fibers are contained in the under-water optical-fiber cable, it is required that the splice points of the optical fibers are passed on a tensile test in which the spliced parts are tensioned by 2% to 3% in its elongation during the cable manufacturing process. This figure is two or three times as large as a tensile strength required for the ordinary splice points of the optical fibers.

Figure 8:
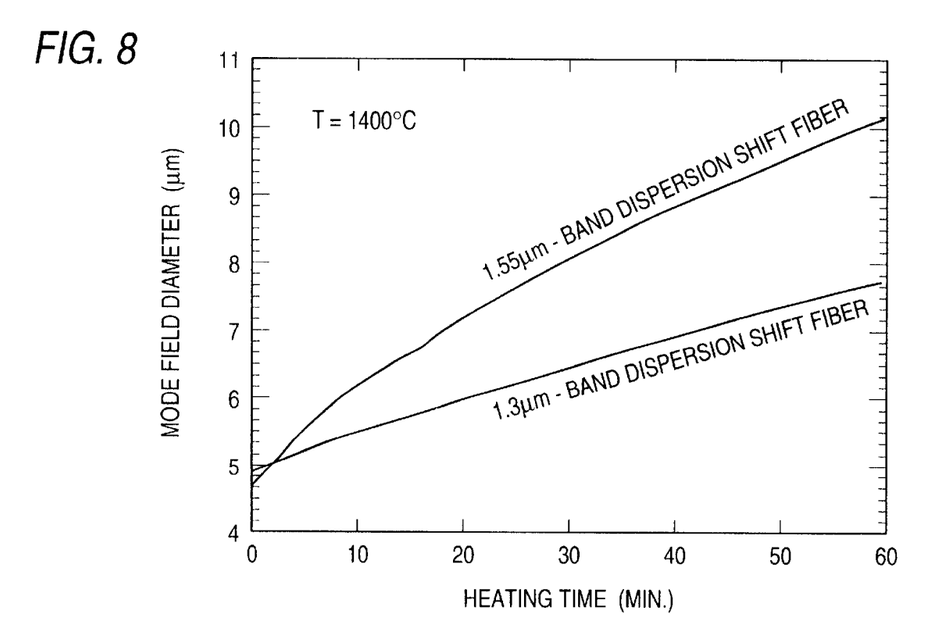
FIG. 8 is a graph showing dependence of mode field distributions of two dispersion shifted fibers on heating time.

A technique to match the mode field distributions of two single mode optical fibers to be spliced, viz., to make a mode field distribution of one single mode optical fiber coincident in configuration with that of the other single mode optical fiber by expanding the mode field distribution of the former is described by Kihara et al., in their paper in "The Transactions of the Institute of Electronics, Information and Communication Engineers, B-I, Vol. J-75-B-1, No. 7, pp467–470, July, 1991)". The technique discussed in the paper is constructed such that the dopants contained in the core of the optical fiber are diffused by heating the optical fiber to make the refractive index distribution of the optical fiber flat in configuration and consequently to expand the mode field distribution of the optical fiber. FIG. 8 shows a relationship between an expansion of the mode field diameter of the optical fiber and heating time when the optical fiber is heated at 1400° C., which is described in the paper. The paper teaches that for a 1.55 $\mu$m-band dispersion shifted fiber and a 1.3 $\mu$m-band single mode optical fiber, the fusion characteristics by the heating and the dopant diffusion characteristics vary depending on the refractive index distributions and the materials constituting the optical fibers, and that variations of the mode field diameters are different even when the optical fibers are heated for the equal heating time. In the paper, there is a description "an exact measurement of heating temperature and its control are difficult at present". The paper does not refer to a reliability of the splice point of the single mode optical fibers fusion spliced, and hence it is clear that the difficulty of the exact measurement of heating temperature and its control has not yet been removed.

SUMMARY OF THE INVENTION

Accordingly, the present invention has an object to provide an optical-fiber fusion-splicing method for fusion-splicing optical fibers with different mode field distributions at low splice loss and with less reduction of its mechanical strength. That is, an object of the invention is to provide an optical-fiber fusion-splicing method for fusion-splicing optical fibers with different refractive index distributions at low splice loss and high mechanical strength.

According to the present invention, there is provided an optical-fiber fusion-splicing method comprising the steps of: removing the coating of one end part of each of two optical fibers with different mode field distributions to be spliced; heating the exposed end part of at least one of the optical fibers, to thereby vary a mode field distribution thereof; cleaving the exposed end part of at least one of the optical fibers so that the mode field distributions at the splice end faces of the two optical fibers are substantially coincident with each other in configuration; fusion-splicing the two optical fibers; and immersing the heated portion of the exposed end part of the fusion-spliced optical fiber in a hydrofluoric acid solution, to thereby effect a surface treatment thereof. Thus, a low loss splice is realized by making the mode field distributions at the cleaved end faces of the two optical fibers are made to be substantially coincident with each other in configuration. A high strength splice is realized by the surface treatment using a hydrofluoric acid solution.

In the optical-fiber fusion-splicing method, the heating of the exposed end part of the optical fiber is carried out such that the coated end part and the exposed end part of the optical fiber are gripped, and a portion of the optical fiber located between the gripping positions is heated.

In the optical-fiber fusion-splicing method, a temperature at which the exposed end part of the optical fiber is heated is selected to be a temperature lower than a melting point of the optical fiber but higher than a temperature at which the dopants of the optical fiber are substantially diffused. A proper diffusion of the dopants is secured by using hydrocarbon gas for the heat source, to thereby expand the mode field distribution.

In the optical-fiber fusion-splicing method, the surface treatment of the exposed end part of the optical fiber is carried out in a manner that a container of which the width is shorter than an exposed end part of a fusion-spliced optical fiber is filled with a hydrofluoric acid solution, and the exposed end part of the fusion-spliced optical fiber is immersed, while being held in a straightened state, in a portion of the hydrofluoric acid solution, which stands up the rim of the container by its surface tension.

In the optical-fiber fusion-splicing method, the surface treatment is carried out in a manner that the exposed end part of the fusion-spliced optical fiber is immersed in a hydrofluoric acid solution containing hydrofluoric acid of about 10% by volume ratio for a time of five minutes or longer but ten minutes or shorter.

PREFERRED EMBODIMENTS OF THE INVENTION

Preferred embodiment according to the present invention will be described as follow referring to the accompanying drawings.

Figure 1:
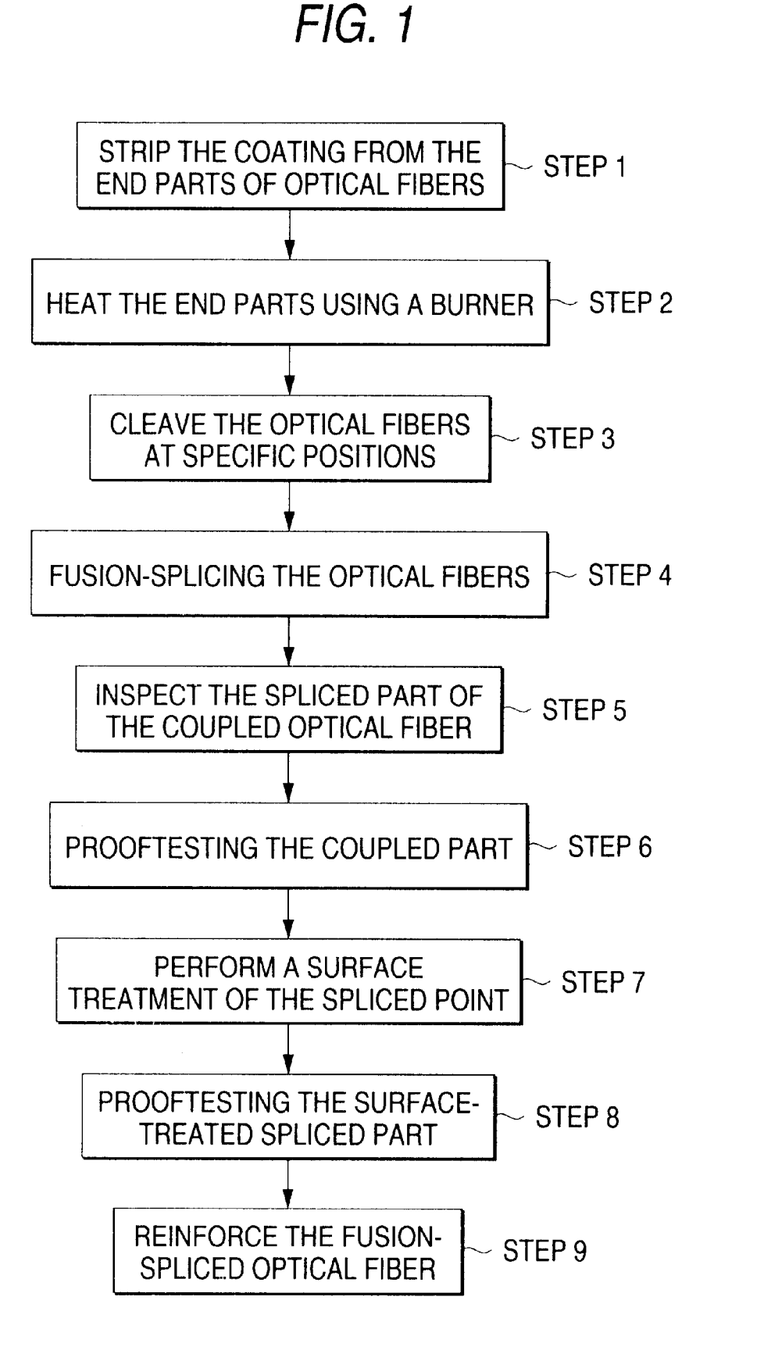
FIG. 1 is a flow chart showing a process flow in a fusion-splicing method for fusion-splicing optical fibers according to the present invention.

A flow chart showing a process flow in a fusion-splicing method for fusion-splicing optical fibers according to the present invention is shown in FIG. 1. The fusion-splicing method of the invention includes: a step 1 of stripping the coating of the end parts of optical fibers to be spliced; a step 2 of heating, by burning, the stripped or exposed end parts of the optical fibers in order to expand a mode field distribution of the optical fiber; a step 3 of cleaveing the optical fibers at positions where the mode field distributions of the optical fibers are substantially coincident with each other in distribution configuration; a step 4 of fusion-splicing the optical fibers; a step 5 of inspecting the fusion-spliced optical fiber; a step 6 of prooftesting the spliced optical fiber; a step 7 of immersing the exposed end part of the fusion-spliced optical fiber into a hydrofluoric acid solution, whereby the exposed end part of the optical fiber is etched for its surface treatment; a step 8 of prooftesting the spliced optical fiber; and a step 9 of reinforcing the spliced optical fiber. Incidentally, other orders of the prooftesting may be available.

The fusion-splicing method of the invention is distinguished from the conventional one by the steps 2, 3 and 7. In the step 2, the exposed end part of at least one of the optical fibers to be spliced is heated to diffuse dopants contained in the optical fiber in order to make a mode filed distribution of one of the optical fibers coincide that of the other in distribution configuration. In the step 3, the exposed end parts of the two optical fibers are cleaved at positions where the mode field distributions of the optical fibers are substantially coincident with each other in distribution configuration. In the step 7, the exposed end part of the optical fiber that was fusion-spliced in the step 2 is etched in a hydrofluoric acid solution for its surface treatment.

The reason why the process of FIG. 1 contains the etching step 8 using the hydrofluoric acid solution follows. When a mode field distribution of each of optical fibers to be spliced is expanded by heating those optical fibers by a burner, for example, the glass surfaces of the exposed end parts of the single mode optical fibers are heated for a relatively long time. The glass surfaces are made uneven by flame abrasion or impurities, for example, that are contained in flame attack to the glass surface, possibly reducing a mechanical strength of the fusion-spliced optical fiber. To avoid this, the glass surface of the exposed end part of the spliced optical fiber is smoothed by the etching using the hydrofluoric acid solution, whereby impurities are removed from the glass surface and reduction of the mechanical strength of the optical fibers is prevented.

Figure 2A:
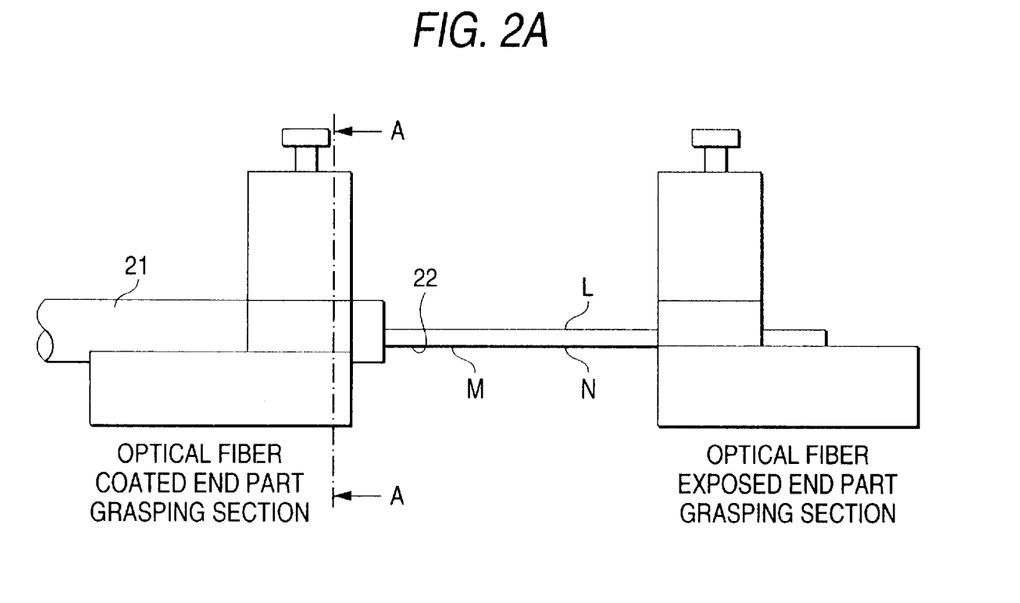
FIG. 2A is a front view showing an optical-fiber gripping mechanism.
Figure 2B:
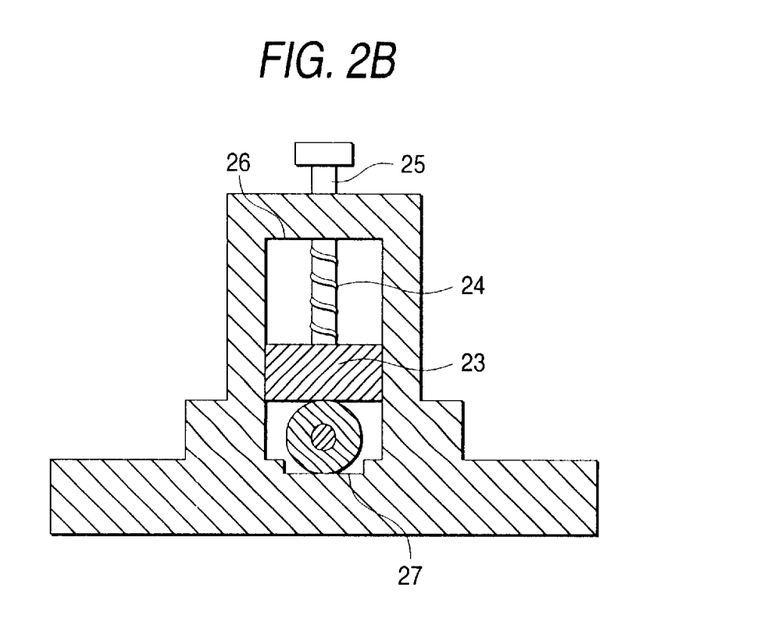
FIG. 2B is a cross sectional view taken on line A—A in FIG. 2A.

An optical-fiber gripping mechanism used when a mode field distribution of each of the aligned optical fibers to be spliced is expanded by heating those optical fibers by a burner, is shown in FIGS. 2A and 2B. FIG. 2A. is a front view showing the optical-fiber gripping mechanism, and FIG. 2B is a cross sectional view taken on line A—A in FIG. 2A. The optical-fiber gripping mechanism of FIG. 2 includes an optical-fiber coated end part grasping section and an optical-fiber exposed end part grasping section, which are oppositely disposed. In the optical-fiber coated end part grasping section, a coated end part 21 of the optical fiber is clamped to a guide groove 27 with a clamping member 23. A clamping force of the clamping member 23 for clamping the coated end part 21 is generated by such a structure that a spring 24 is wound around a bar 25, and is inserted, while being compressed, between an upper side 26 of the optical-fiber coated end part grasping section and the clamping member 23.

A construction of the optical-fiber exposed end part grasping section is substantially the same as of the optical-fiber coated end part grasping section. It is evident that the optical-fiber coated and exposed end part grasping sections are not limited to the above-mentioned ones. When any other suitable mechanism is used, and the coated end part 21 and an exposed end part 22 are simultaneously gripped with the optical-fiber coated end part grasping section and the optical-fiber exposed end part grasping section, respectively, the optical fiber is not twisted or bent, as a matter of consequence. If the optical fiber is heated by the burner in a state that it is twisted or bent, the exposed end part 22 of the optical fiber is thermally fixed in a state that it is twisted. This twisting state of the optical fiber adversely affects the polarization characteristics of the optical fiber. The gas was chosen because it is easy to control the temperature and is less harmful, less influential to the optical fiber strength.

A temperature at which the single mode optical fiber is heated must be selected to be a temperature lower than a melting point of the optical fiber but higher than a temperature at which the dopants of the optical fiber are substantially diffused, as a matter of course. It was found that use of combustible gas, such as hydrocarbon gas or acid-hydrogen mixture gas, for the heat source is effective in expanding the mode field distribution of the optical fiber.

The optical fiber is gripped at two points, the coated end part and the exposed end part, for the following reason. If the optical fiber is heated in a state that it is gripped at only one end, the optical fiber will be bent down by its weight during its heating, and a shape of the exposed end part of the optical fiber is fixed remaining bent. The thus bent optical fiber is disadvantageous in its splice loss characteristic or in its mechanical strength properties in reinforcing the optical fiber per se. To avoid this, it is necessary to support, in a straight fashion, the exposed end part of the optical fiber between the optical-fiber coated end part grasping section and the optical-fiber exposed end part grasping section in FIGS. 2A and 2B. In this optical-fiber gripping mechanism, one of the gripping positions of the optical fiber is the coated end part of the optical fiber. The reason for this is that if the exposed end part of the optical fiber is directly gripped, there is a danger of reducing a strength of the optical fiber, and hence it is undesirable to grip a portion of the exposed end part of the optical fiber which is placed in the splicer and left after the fibers are spliced.

In FIG. 2A, the exposed end part of the optical fiber is heated over its portion ranging from a point M to a point N, and then it is cleave at a point L where a proper mode field distribution is set up.

Figure 3:
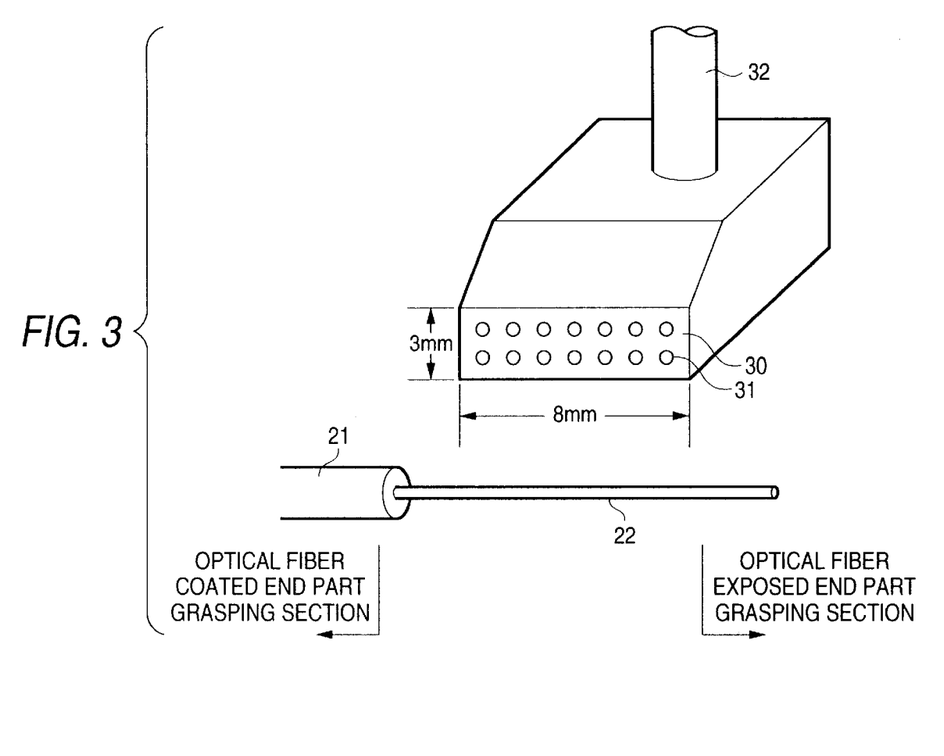
FIG. 3 is a diagram showing an example of a configuration of a burner used in the heating process of the optical fiber and a location of the optical fiber within the burner.

An example of a configuration of a burner used in the heating process of the optical fiber and a location of the optical fiber within the burner are illustrated in FIG. 3. The burner inclusive of a supplying pipe 32 for supplying combustion gas and/or oxygen is made preferably of a material not to generate metal particles in flame, for example, stainless steel which may be pickled. In the example illustrated in FIG. 3, fourteen blowing holes 31 are arrayed in a blowing face 30 of 3 mm in height and 8 mm in width. It is desirable that to secure a flat temperature distribution configuration, the burner is designed such that a number of small blowing holes are arrayed in a surface to form an aggregation of small flames. If so designed, a uniform temperature is secured.

A proper temperature at which the optical fiber is heated is below a melting point of the optical fiber, and within a range from 1300° C. to 1600° C. within which diffusion of germanium oxide as dopants of the optical fiber is allowed. In addition, the temperature range between 1500° C. to 1600° C. is favorable to quickly diffusing the dopants. For ease of handling, combustion gas used is preferably hydrocarbon gas or acid-hydrogen mixture gas. The conditions to achieve the heating temperature were empirically obtained. In the experiment, propane gas was used for the hydrocarbon gas, and the burner of FIG. 3 was used. The result of the experiment was that a flow rate of the propane gas was 16 cc to 20 cc/minute, and a flow rate of oxygen was 35 cc to 44 cc per/minute.

An aerial discharge using a fusion splicer or a carbon dioxide gas laser is inappropriate to the heat source for the following reason. A heating zone by the aerial discharge or a laser is extremely small when comparing with the case where the burner is used, and therefore, use of the aerial discharge for the heat source is not suitable for configuring a mode field distribution such that it gently vary in the longitudinal direction of the optical fiber. In the case of the heating with a high heat resistant member, a heat radiation area by it is broader than by the combustion gas. This possibly gives rise to deterioration or burn of the coating of the fiber. In this respect, it is undesirable to use of the heat resistant member.

Figure 4:
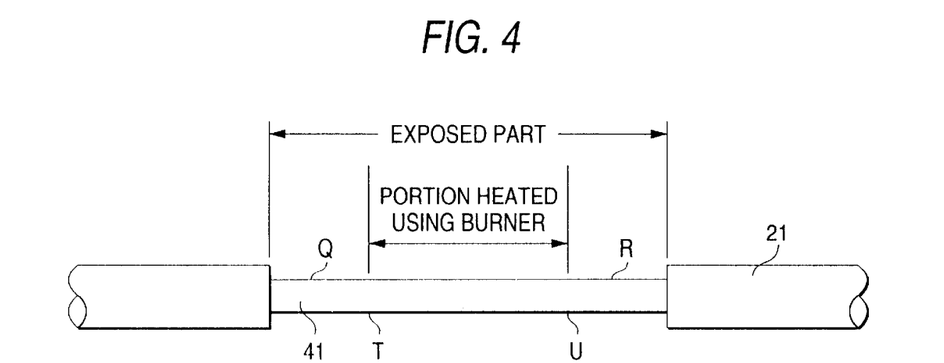
FIG. 4 is a front view showing an of optical fiber which is fusion spliced together.

FIG. 4 is a front view showing an optical fiber which is fusion-spliced together. A length of the exposed end part of the optical fiber fusion spliced is approximately 14 mm, and a length of a portion heated by the burner is approximately 8 mm. The portion of the exposed end part heated by the burner must be subjected to the surface treatment using a hydrofluoric acid solution, for the purpose of securing its mechanical strength. In the case of FIG. 4, the following specific portion of the exposed end part of the optical fiber was subjected to a surface treatment by etching using the hydrofluoric acid solution: the surface-treated portion was within a range from a point Q to a point R including the heating portion from a point T to a point U including a fusion splicing position.

The hydrofluoric acid solution is removed after the washing which follows the surface treatment by etching. If the hydrofluoric acid solution enters between the coated end part 21 of the optical fiber and the optical fiber 41 of the spliced optical fiber during the etching process, it is difficult to completely remove it even if the washing is carried out, however. For this reason, an etching length by using the hydrofluoric acid solution must be shorter than the length of the exposed end part of the optical fiber. In the case of FIG. 4, the etching length by the hydrofluoric acid solution is selected to be 10 mm while regard is paid to the fact that the length of the exposed end part is 14 mm, thereby succeeding in preventing the hydrofluoric acid solution from entering the boundary between the coated end part 21 of the optical fiber and the coated end part 21 of the spliced optical fiber during the etching process.

Figure 5:
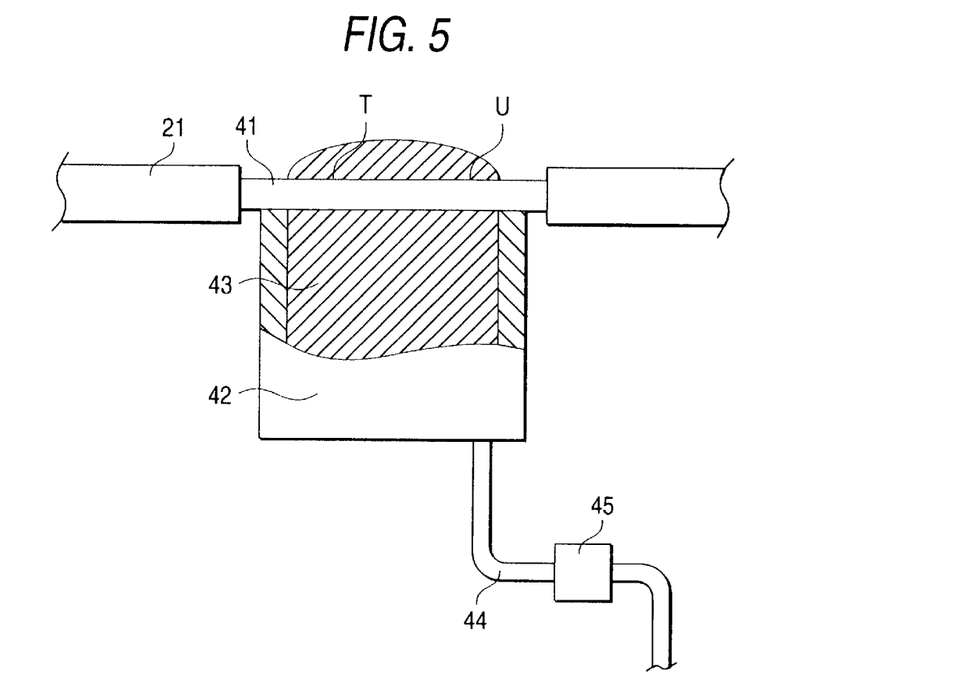
FIG. 5 is a diagram useful in explaining a surface treatment method in which the exposed end part of the spliced optical fiber is etched in the hydrofluoric acid solution.

FIG. 5 is a diagram useful in explaining a surface treatment method in which the exposed end part of the spliced optical fiber is etched in the hydrofluoric acid solution. In FIG. 5, reference numeral 43 designates an hydrofluoric acid solution; 42, a container; 41, an exposed end part of a fusion-spliced optical fiber; 21, a coated end part of the optical fiber; 45, a pump; and 44, a pipe. The hydrofluoric acid solution 43 to be supplied to the container 42 is supplied, by use of the pipe 44, to the container from its bottom or side. The width of the container 42 as viewed in the longitudinal direction of the exposed end part of the fusion-spliced optical fiber is 10 mm.

When the container 42 is filled with the hydrofluoric acid solution 43, in case of the volume ratio of the hydrofluoric acid solution is 10%, the hydrofluoric acid solution stands up above the rim of the container by 3 mm to 4 mm, by its surface tension. The exposed end part of the fusion-spliced optical fiber, 125 $\mu$m in diameter, is made to rectilinearly pass through the swollen portion of the hydrofluoric acid solution. As a result, the surface treatment of the portion of the exposed end part 41 of the fusion-spliced optical fiber, which was heated for the purpose of expanding a mode field distribution thereof, may be carried out without bending the exposed end part in any way and further without the entering of the hydrofluoric acid solution 43 into the boundary between the exposed end part 41 of the fusion-spliced optical fiber and the coated end part 21 of the optical fiber.

The volume ratio of the hydrofluoric acid solution is preferably in the range of 5 to 20%, more preferably, 8 to 12%. If the volume ratio is made smaller, the immersing time of the optical fiber within the solution is made longer, so as to deteriorate the workability. If the volume ratio is made larger, the proceeding of the reaction is made faster, so as to disperse the characteristic of the optical fiber. Incidentally, it is possible to remove the thicker region of the optical fiber glass by using the high concentration solution and immersing it within the solution for long time. Such a removing is effective to remove scratches of the surface of the optical fiber and impurities around its surface. However, the uneveness of its surface is made large, and the outer diameter of the optical fiber is reduced so that its sectional area is reduced. According to these factors, there is disadvantage that the break strength is lowered.

Thus, the length of the portion of the etched part of the optical fiber, which is processed by the hydrofluoric acid solution, may be controlled to be a fixed length in a manner that by the utilization of the swelling of the surface of the hydrofluoric acid solution filling the container by its surface tension, the exposed end part of the fusion-spliced optical fiber, while being straightened, is immersed into the swollen portion of the hydrofluoric acid solution. To secure a more exact etching portion in reference to the fusion-spliced of the optical fiber, the exposed end part of the fusion-spliced optical fiber must be moved relative to the container, and positioned in place. A required accuracy of the positioning is about 1 mm at the maximum, and this figure can easily be obtained in an ordinary positioning stage with a micrometer.

Incidentally, there is another splice method using surface treatment before the fusion splicing, the exposed part of one of the ends of an optical fiber to be spliced is immersed into the hydrofluoric acid solution. However, this method is not suggestible because the end face of the optical fiber to be used for the splicing is etched by the hydrofluoric acid solution, and as a result, the mode field distribution is varied. In another case where the exposed part of the fusion-spliced optical fiber is immersed in the etching solution while being bent, the exposed part of an increased length must be used because of restriction by a tolerable bending radius of it. This leads to size increase of the fiber splicing portion. In this respect, it is not suggestible to use the method in which the exposed part of the fusion-spliced optical fiber is immersed in a bending state. In the embodiment, a container of 10 mm wide is used for processing the portion of 8 mm long as the by-burner heating portion of the exposed end part of the fusion-spliced optical fiber. The container is made of vinyl chloride. In the 10% (volume ratio) hydrofluoric acid solution, an etching rate for silica glass is about 35 $\mu$m/hour. The etching process for about 5 to 10 minutes will do for a satisfactory mechanical strength of it. If the etching time is shorter, there is a danger of remaining a deteriorated portion. If the etching time is longer, there is also a danger to etch the optical fiber to much resulting in reducing the strength.

A simple way of inspecting a variation of the mode field diameter of the optical fiber that is caused by the heating is that an optical fiber of which the coating is removed is observed by a microscope while throwing light on and passing it through the bare optical fiber (transmission illumination). The core of the optical fiber has a refractive index distribution configured such that it is symmetrical with respect to the central axis of the optical fiber. Therefore, when the exposed end part of the fusion-spliced optical fiber is observed from its side, the optical fiber functions as a cylindrical lens containing the refractive index distribution therein. Accordingly, the refractive index distribution is varied by heating the optical fiber, and hence the lens characteristics also vary. Thus, a variation of the mode field distribution in the optical fiber may be inspected in a manner that the optical fiber is placed in the transmission illumination, and a state of rays of light refracted in and transmitted through the optical fiber FIG. 7 is observed by the microscope.

Figure 6:
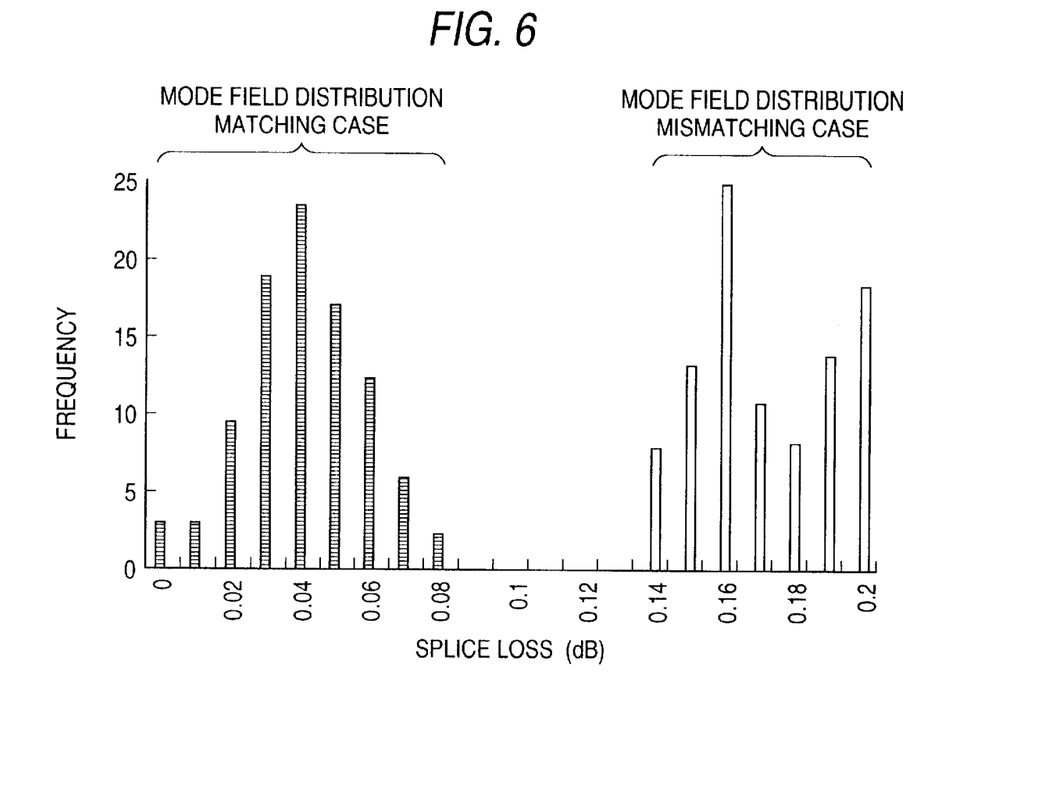
FIG. 6 is a graphical representation for comparatively showing a splice loss by the optical-fiber fusion splicing method of the invention and that by a conventional fusion splicing method.

FIG. 6 is a graph showing the improvement of the optical fiber in its splice loss by the invention. A single mode optical fiber of 6 $\mu$m in mode field diameter and another single mode optical fiber of 10 $\mu$m in mode field diameter were fusion-spliced into a first fusion-spliced optical fiber by a conventional fusion splicing method (i.e., those two single mode optical fibers are fusion-spliced while not matched in their mode field distributions.). Those optical fibers were also fusion-spliced into a second fusion-spliced optical fiber by the fusion splicing method of the invention in a state that the mode field distributions of the optical fibers are matched. Splice loss of the resultant first and second fusion-spliced optical fibers were measured and the measuring results were compared. An average splice loss of the first fusion-spliced optical fiber was 0.17 dB, while that of the second fusion-spliced optical fiber was 0.04 dB. Comparison of those figures shows the improvement of the second fusion-spliced optical fiber in the splice loss. A wave length of light used for the measurement was 1.55 $\mu$m.

Figure 7:
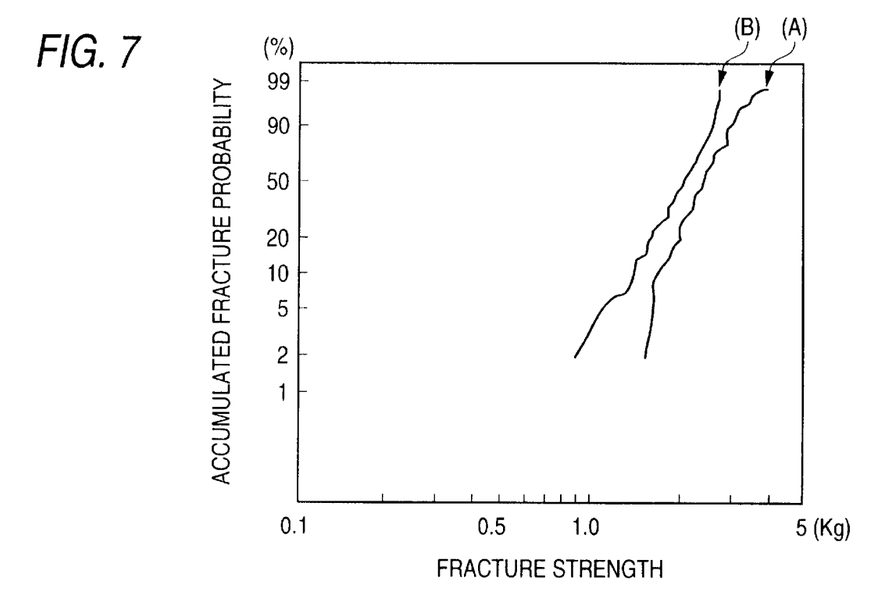
FIG. 7 is a graphical representation of the results of measurements of tensile fracture strength of a fusion-spliced optical fiber formed by the fusion-splicing method of the invention, and another fusion-spliced optical fiber by a conventional fusion-splicing method.

FIG. 7 shows the results of measurements of tensile fracture strength of a fusion-spliced optical fiber formed according to the FIG. 1 process, and another fusion-spliced optical fiber by the FIG. 1 fusion-splicing process not including the step 7 of the surface treatment by the hydrofluoric acid solution. A polygonal line (A) in FIG. 7 indicates a relationship between a tensile fracture strength and an accumulated fracture probability of the fusion-spliced optical fiber that is formed by the FIG. 1 process, and another polygonal line (B) represents a relationship between a tensile fracture strength and an accumulated fracture probability of the fusion-spliced optical fiber that is formed according to the FIG. 1 fusion-splicing process not including the step 7 of the surface treatment by the hydrofluoric acid solution. From the Weibull distribution curves shown in FIG. 7, it is seen that the fusion-spliced optical fiber formed by the fusion-splicing method in which a portion of the optical fiber of which the mode field distribution is varied by the burner heating is etched in the hydrofluoric acid solution is improved in mechanical strength over the fusion-spliced optical fiber formed by the fusion-splicing method not using such an etching process. From this fact, it is confirmed that the step of the surface treatment using the hydrofluoric acid solution, which is essential to the present invention, effectively improves the performance of the fusion-spliced optical fiber.

As seen from the foregoing description, optical fibers with different mode field distributions may be fusion spliced at low splice loss and high strength by additionally using a step of heating, by a burner, an exposed part of one end of the optical fiber to be fusion-spliced when the optical fibers with different mode field distributions are fusion-spliced together, whereby its mode field distribution is continuously varied in the longitudinal direction of the optical fiber, a step of cleaving a portion of the spliced optical fiber at a position where the mode field distribution is varied so that the mode field distributions at the splice end faces of the two optical fibers to be fusion-spliced are substantially coincident with each other in configuration, and a surface treatment step in which the exposed part of a fusion-spliced optical fiber is held while being stretched with minimum tension, and a portion of the exposed end part which is heated by the burner is immersed into a hydrofluoric acid solution in a stretched state.

According to the present invention, when optical fibers, such as dispersion shifted optical fibers, which have different refractive index distributions and mode field distributions in consequence of their required characteristics are spliced, or such an optical fiber is spliced to a dispersion compensating fiber of which the mode field distribution is different from that of the former, the resultant splice is low in splice loss and high in reliability.

What is claimed is:

1. An optical-fiber fusion-splicing method comprising the steps of:

removing the coating of one end part of each of two optical fibers with different mode field distributions to be spliced;

heating the exposed end part of at least one of said optical fibers, to thereby vary a mode field distribution thereof;

cleaving the exposed end part of at least one of said optical fibers so that the mode field distributions at the cleaved end faces of said two optical fibers are substantially coincident with each other in configuration;

fusion splicing said two optical fibers; and immersing the heated portion of the exposed end part of the fusion-spliced optical fiber in a hydrofluoric acid solution, to there effect a surface treatment thereof, wherein said surface treatment of said exposed end part of said optical fiber is carried out in a manner that a container of which the width is shorter than an exposed end part of a fusion-spliced optical fiber is filled with a hydrofluoric solution, and said exposed end part of said fusion-spliced optical fiber is immersed, while being held in a straightened state, in a portion of said hydrofluoric acid solution, which stands up the rim of said container by its surface tension.

2. The optical-fiber fusion-splicing method according to 1, wherein said surface treatment is carried out in a manner that said exposed end part of said fusion-spliced optical fiber is immersed in a hydrofluoric acid solution containing hydrofluoric acid of about 10% by volume ratio for a time of five minutes or longer but ten minutes or shorter.

* * * * *